March 11, 1924.

E. C. POST

PRESSURE REDUCING VALVE

Filed Sept. 14, 1920

1,486,452

Inventor
Edward C. Post
By Barnett Truman
Attorneys.

Patented Mar. 11, 1924.

1,486,452

UNITED STATES PATENT OFFICE.

EDWARD C. POST, OF CHICAGO, ILLINOIS, ASSIGNOR TO VAPOR CAR HEATING COMPANY, INC., OF CHICAGO, ILLINOIS, A CORPORATION OF NEW YORK.

PRESSURE-REDUCING VALVE.

Application filed September 14, 1920. Serial No. 410,170.

*To all whom it may concern:*

Be it known that I, EDWARD C. POST, a citizen of the United States, residing at Chicago, in the county of Cook and State of Illinois, have invented certain new and useful Improvements in Pressure-Reducing Valves, of which the following is a specification.

My invention relates to a pressure reducing device of the type involving a main valve which is moved from its seat by a piston subject to fluid pressure introduced into the piston cylinder from the high pressure side of the device through a duct adapted to be closed by an auxiliary valve that is controlled by a spring pressed diaphragm subject to fluid pressure on the low pressure side of the device. The proper functioning of a pressure reducing valve of this type to maintain the fluid on the low pressure side of the valve at the pressure for which the device is set is dependent upon a rather delicate and sensitive balancing of the parts, and in particular upon the freedom of movement of the valve operating piston in its cylinder, and upon having a nice fit between piston and cylinder so as to prevent appreciable leakage around the piston.

The primary object of this invention is to provide a new arrangement of the elements of a valve of this type whereby the main valve operating piston and its cylinder are readily accessible in case the valve ceases to function accurately, besides being removable without dismounting the valve as a whole or disturbing the other parts thereof and without shutting off the steam or other fluid from the device so that the trouble caused by the sticking or leaking of the piston may be conveniently remedied and new parts substituted if need be.

The invention consists in the novel constructions, combinations, and arrangements hereinafter described and claimed, for carrying out the above stated object and such other objects as will appear from the following description.

In the drawings I have illustrated a preferred embodiment of the invention in which.

Like characters of reference designate like parts in the several figures of the drawings.

Figures 1, 2, 3:
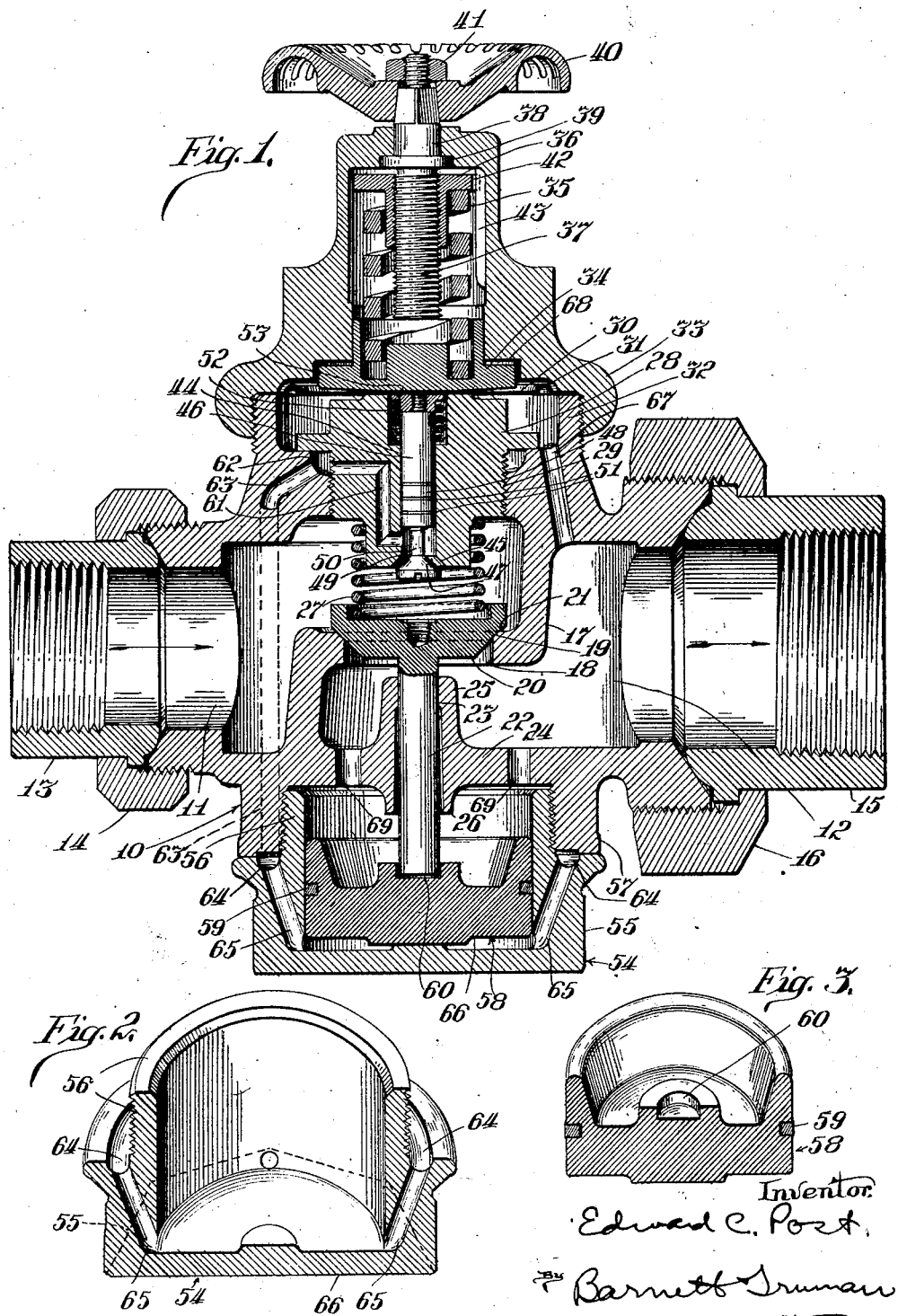
Figure 1 is a sectional elevation of the valve.
Figure 2 is a sectional perspective of the movable piston chamber.
Figure 3 is a corresponding sectional perspective of the removable piston.

In the drawing, 10 is the body or casing of the valve provided with an inlet opening 11 and an outlet opening 12. The inlet opening is provided with a tail piece 13, internally threaded and secured to the valve casing by the internally threaded union nut 14. The tail piece 13 may be varied to conform to the size of pipe and particular threading thereon to which the valve is desired to be connected. The outlet 12 is similarly provided with a tail piece 15 and a union nut 16, preferably of somewhat larger internal diameter.

Between the inlet and outlet openings is a web or partition 17 provided with an opening 18, the edge of which web is finished to form a valve seat 19. A main valve 20, preferably formed with a conical face 21 is adapted to seat on the seat 19. The main valve is provided with a stem 22 extending through an opening 23 in the lower wall 24 of the valve casing. Preferably the lower wall of the casing is provided with bosses 25 and 26 to serve as a guide for the valve stem 22. The opening 23 is of a size to permit the free movement of the valve without permitting any lateral play of the valve stem.

The valve 20 is pressed on its seat by the spring 27, which extends between the upper face of the valve and the nut or plug 28 which is screwed within the opening 29 of the valve casing.

Directly above the plug 28 is a diaphragm 30 having an annular stiffening rib 31. The diaphragm is held in position between the annular rim 32 of the valve casing and the top 33 screwed thereon. The diaphragm button 34 slidably mounted within the top 33 is pressed against the diaphragm and the top of the plug 28 by the spring 35, also contained within the top 33. The upper end of the spring bears against the compressing nut 36 into which the threaded stem 37 of the compression screw 38 is screwed. The compression screw 38 is provided with a thrust collar 39 and a hand wheel 40 which is secured thereto by the nut 41. The pressure of the spring on the diaphragm button 34 may be varied by screwing the compression nut 36 up or down by the hand wheel 40. In order to prevent the rotation of the compression nut 36 the same is provided with a notch 42 within which the rib 43 of the top 33 fits.

The plug 28 is provided with a central opening 44 terminating in the auxiliary valve seat 45. Within the opening 44 is the auxiliary valve 46 comprising the valve proper having a conical seating surface 47, a valve stem 48 slidably fitting in the opening 44 and the neck 49 providing an annular space 50 within the opening 44. The auxiliary valve stem 48 is provided with a plurality of circumferential grooves 51 which serve as packings to prevent leakage between the valve stem and the plug 28. The auxiliary valve is seated by the spring 52 which engages the rim 53 of the valve stem.

Detachably secured to the lower part of the valve casing is a cap or cylinder 54 providing a piston chamber, said cap having an octagonal outer face 55 which is adapted to be engaged by a suitable wrench. The cap 54 is provided with a screw threaded flange 56 which is adapted to screw within a corresponding flange 57 on the valve casing. Within the piston chamber is a free piston 58 having a suitable packing 59 and adapted to engage the lower end of the valve stem 22. For this purpose the upper surface of the piston is provided with a suitable seat 60.

The successful operation of valves of this type depends in a large measure upon a proper fit between the piston and piston chamber so the piston may freely move in its chamber without danger of sticking and so that there will be no leakage.

It is not unusual when a pressure reducing valve fails to operate properly for the attendant to hammer upon the valve casing on the theory that some parts of the device are sticking and can be freed by jarring. The hammering is likely, however, to dent the casing and permanently disable the mechanism. By having the piston and cylinder in such a position that they can be easily removed and cleaned or repaired and new parts substituted for the old when the latter are worn or injured the temptation to mishandle the device when it does not function properly is lessened and the repair of the valve injured from the above noted or other causes is not only made possible but convenient.

Operation: Steam or other fluid, the pressure of which it is desired to reduce, is admitted to the valve casing through the inlet opening 11. The valve is opened by screwing in a counter-clockwise direction hand wheel 40 which moves the compression nut 36 downwardly and places sufficient pressure upon the diaphragm to open slightly the auxiliary valve 46, the stem of which contacts with the lower surface of the diaphragm. The steam or other fluid passes through the auxiliary valve into the annular space 50 and through the passage 61 in the valve plug to the annular space 62 formed in the casing. From this space the steam passes through the passage 63 in the wall of the casing to the annular space 64 in the piston chamber. From this space it passes through one or more passages 65 in the body of the piston chamber to the lower face 66 of the piston. The pressure on the lower face of the piston raises the main valve from its seat and permits the direct passage of the steam or fluid through the main valve to the outlet 12. When the pressure in the outlet passage reaches the amount to which it is desired to reduce the pressure of the fluid, it reacts on the lower face of the diaphragm through the passage 67 and raises the same against the pressure of the spring 35 sufficiently to permit the auxiliary valve to close. This cuts off the access of the fluid to the lower face of the piston and permits the main valve to be closed by the spring 27. When the pressure in the outlet passage falls slightly the diaphragm is again moved down by the pressure of the spring 35 and the auxiliary valve is opened thus causing the opening of the main valve.

The pressure to which the fluid is reduced is controlled by the valve wheel 40 which serves to vary the pressure of the diaphragm button against the diaphragm. The pressure in the outlet passage is reduced by relieving the pressure on the diaphragm, and increased by increasing the pressure of spring 35. In order to close the valve all pressure is removed from the diaphragm so as to permit the auxiliary valve to remain closed.

In order to prevent buckling or breaking of the diaphragm because of unusual or excessive back pressures in the outlet passage the cap 33 is provided with a stop 68 to limit the upward movement of the diaphragm button 34. The amount of play between the stop 68 and the diaphragm button 34 is only slightly in excess of the amount required to permit the closing of the auxiliary valve.

When the piston chamber or the piston become worn, they may be replaced by unscrewing the cylinder or cap from the valve body. It is not necessary to replace the entire valve casing when these parts become worn. Moreover, by relieving the diaphragm of the pressure of spring 35 the removal of the piston cylinder can be effected without dismounting the valve from the steam pipes between which it is located or shutting off of the steam from the high pressure side of the valve.

Openings 69 are made through the wall 24 so as to permit the piston to move freely under the pressures on its upper and lower faces.

I claim:

1. In a pressure reducing valve, the combination with a valve casing having inlet and outlet openings, a main valve between said openings, a cylinder detachably secured to said casing the outer or head end only of which is in communication with the inlet side of the valve casing and a free piston in said cylinder adapted by a stroke in one direction to open said valve.

2. In a pressure reducing valve having a piston for operating a main valve, the combination of a valve casing having a threaded flange and a threaded cylinder for said piston screwed to said flange, said cylinder having a circular groove therein adjacent to said flange and having a passage leading from the groove to the head of the piston, said casing being provided with a pressure passage leading to said groove in said piston chamber.

3. In a pressure reducing device, the combination with a main valve, a valve casing formed with a port controlled by the main valve and a duct leading from the high pressure side of the device, an auxiliary valve to close said duct and a pressure sensitive element subject to fluid pressure on the low pressure side of the device for operating the auxiliary valve; of a piston for operating said main valve and a cylinder removably attached to said casing in which the piston operates and provided with a duct leading to the face of the piston remote from the valve which duct communicates with the aforesaid duct in the casing and provides therewith the only opening as between the cylinder and the high pressure side of the device.

4. In a pressure reducing device, the combination with a main valve, a valve casing formed with a port controlled by the main valve and a duct leading from the high pressure side of the device, an auxiliary valve to close said duct, and a pressure sensitive element subject to fluid pressure on the low pressure side of the device for operating the auxiliary valve; of a stem on the main valve, a piston detachably engaged with said stem, and a cylinder removably attached to said casing in which the piston operates and provided with a duct leading to the face of the piston remote from the valve which duct communicates with the aforesaid duct in the casing and provides therewith the only opening as between the cylinder and the high pressure side of the device.

5. In a pressure reducing device, the combination with a main valve, a valve casing formed with a port controlled by the main valve and a duct leading from the high pressure side of the device, an auxiliary valve to close said duct and a pressure sensitive element subject to fluid pressure on the low pressure side of the device for operating the auxiliary valve; of a piston for operating said main valve, and a cylinder removably attached to said casing on the outside thereof in which the piston operates and provided with a duct leading to the face of the piston remote from the valve which duct communicates with the aforesaid duct in the casing and provides therewith the only opening as between the cylinder and the high pressure side of the device.

6. In a pressure reducing device, the combination with a valve casing formed with inlet and outlet passages, a port between the same and a duct leading from the inlet side of the device, a main valve to control said port, formed with a valve stem, an auxiliary valve to close said duct, a diaphragm subject to fluid on the low pressure side of the device to operate said diaphragm, a spring bearing on said diaphragm, means for adjusting the pressure of said spring, said valve stem, auxiliary valve and spring arranged in line with each other and transversely to said inlet and outlet of the valve casing, a piston detachably engaging said main valve stem, and a cylinder for the piston which is removably attached to said casing on the outside thereof and is provided with a fluid duct communicating with the aforesaid duct in the casing.

EDWARD C. POST.